United States Patent
Takabatake et al.

(10) Patent No.: US 12,325,443 B2
(45) Date of Patent: Jun. 10, 2025

(54) VEHICLE DISPLAY CONTROL DEVICE, VEHICLE DISPLAY SYSTEM, VEHICLE DISPLAY CONTROL METHOD, AND VEHICLE DISPLAY CONTROL PROGRAM

(71) Applicant: TOYOTA JIDOSHA KABUSHIKI KAISHA, Toyota (JP)

(72) Inventors: Satoaki Takabatake, Nisshin (JP); Koji Kimura, Nagoya (JP); Junji Miyazaki, Nagoya (JP); Ryo Ogata, Toyota (JP); Yuki Yoshida, Toyota (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/602,602

(22) Filed: Mar. 12, 2024

(65) Prior Publication Data
US 2024/0217535 A1   Jul. 4, 2024

Related U.S. Application Data

(63) Continuation of application No. 17/372,719, filed on Jul. 12, 2021, now Pat. No. 11,987,258.

(30) Foreign Application Priority Data

Aug. 31, 2020 (JP) .................................. 2020-146332

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 60/0053* (2020.02);
(Continued)

(58) Field of Classification Search
None
See application file for complete search history.

(56) References Cited

U.S. PATENT DOCUMENTS

2016/0121907 A1* 5/2016 Otake ................... B60W 50/14
                                                              701/23
2016/0231743 A1   8/2016 Bendewald et al.
(Continued)

FOREIGN PATENT DOCUMENTS

CN    108349505 A    7/2018
CN    108688665 A    10/2018
(Continued)

OTHER PUBLICATIONS

English Translation of KR 20210152616 A (Year: 2021).
Black Tesla, Tesla v8.0 Autopilot—Warning Interval & Autosteer Unavailable, Sep. 24, 2016, Youtube (Year: 2016).

*Primary Examiner* — James J Lee
*Assistant Examiner* — Andrew Sang Kim
(74) *Attorney, Agent, or Firm* — Oliff PLC

(57) ABSTRACT

A vehicle display control device, includes a memory; and a processor coupled to the memory. The processor is configured to cause a display unit provided in a vehicle cabin to display an inducement image requesting that an occupant grip a steering wheel in a case in which it is necessary for the occupant to grip the steering wheel, and cause the display unit to display the inducement image more prominently in a case of requesting that the occupant grip the steering wheel before the vehicle switches from an autonomous driving mode to a manual driving mode as the vehicle is continuing to drive autonomously, than in a case of requesting that the occupant continue to grip the steering wheel as the vehicle is continuing to drive autonomously.

10 Claims, 16 Drawing Sheets

(51) Int. Cl.
  *B60K 35/23* (2024.01)
  *B60K 35/28* (2024.01)
  *B60K 35/81* (2024.01)
  *B60W 60/00* (2020.01)
  *G06F 3/14* (2006.01)

(52) U.S. Cl.
  CPC ....... *B60W 60/0057* (2020.02); *G06F 3/1407* (2013.01); *B60K 35/23* (2024.01); *B60K 35/28* (2024.01); *B60K 35/81* (2024.01); *B60K 2360/178* (2024.01); *B60K 2360/349* (2024.01); *B60W 2050/146* (2013.01); *B60W 2530/18* (2013.01); *B60W 2540/223* (2020.02)

(56) References Cited

U.S. PATENT DOCUMENTS

| | | |
|---|---|---|
| 2017/0106786 A1 | 4/2017 | Ebina |
| 2018/0215396 A1 | 8/2018 | Miyahara et al. |
| 2018/0281804 A1 | 10/2018 | Talamonti et al. |
| 2018/0281854 A1 | 10/2018 | Talamonti et al. |
| 2018/0281855 A1 | 10/2018 | Talamonti et al. |
| 2018/0281856 A1 | 10/2018 | Talamonti et al. |
| 2018/0284266 A1 | 10/2018 | Talamonti et al. |
| 2018/0286242 A1 | 10/2018 | Talamonti et al. |
| 2019/0004514 A1 | 1/2019 | Hiwatashi et al. |
| 2019/0071099 A1* | 3/2019 | Nishiguchi ........ B62D 15/0255 |
| 2019/0382021 A1 | 12/2019 | Niibo et al. |
| 2020/0148226 A1 | 5/2020 | Kim |
| 2020/0156662 A1 | 5/2020 | Mimura et al. |
| 2021/0146943 A1 | 5/2021 | Oniwa et al. |
| 2022/0234607 A1* | 7/2022 | Hata ..................... B60W 50/16 |
| 2023/0101240 A1* | 3/2023 | Hashimoto ........... B60W 40/08 701/23 |

FOREIGN PATENT DOCUMENTS

| | | |
|---|---|---|
| CN | 110678371 A | 1/2020 |
| EP | 3437949 A1 | 2/2019 |
| EP | 3052353 B1 | 7/2020 |
| JP | 2019-010929 A | 1/2019 |
| JP | 2019-123299 A | 7/2019 |
| JP | 2019-217827 A | 12/2019 |
| WO | 2017/072939 A1 | 5/2017 |

\* cited by examiner

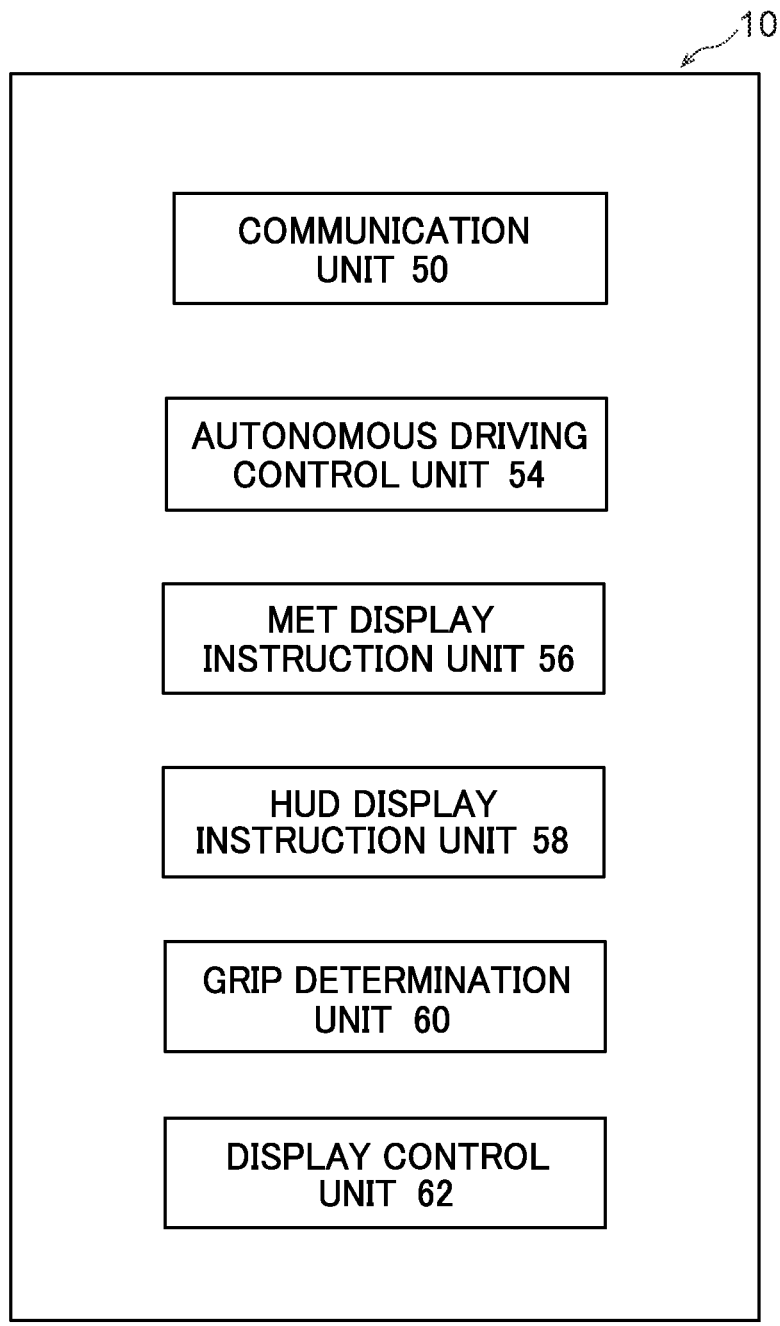

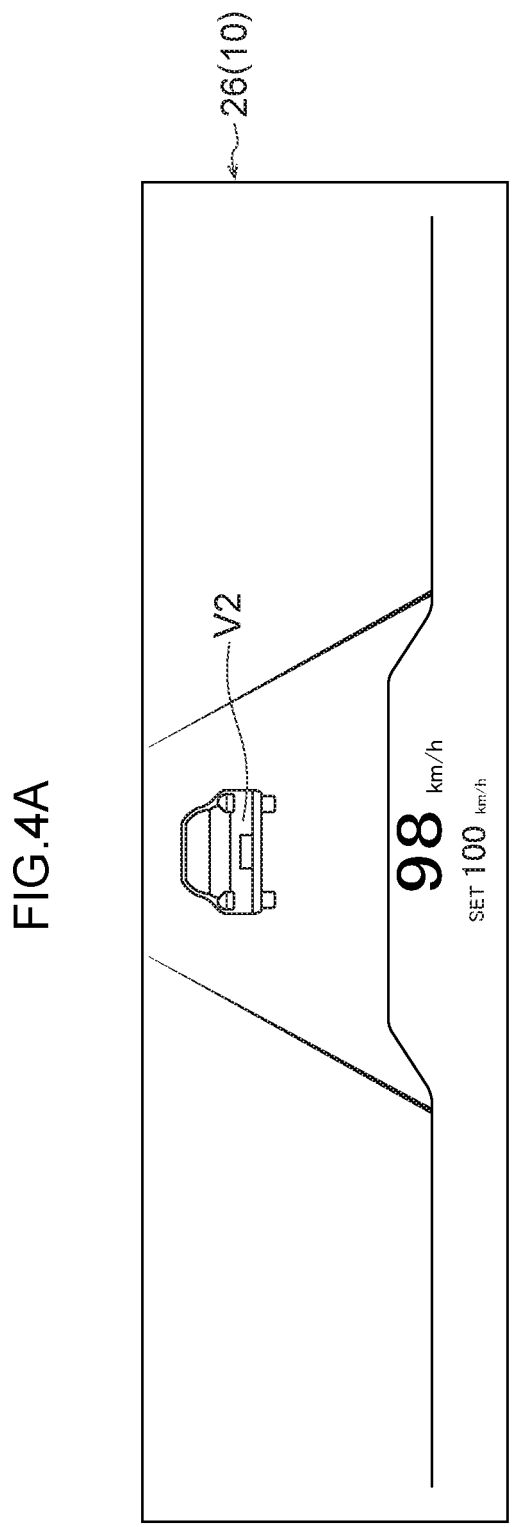

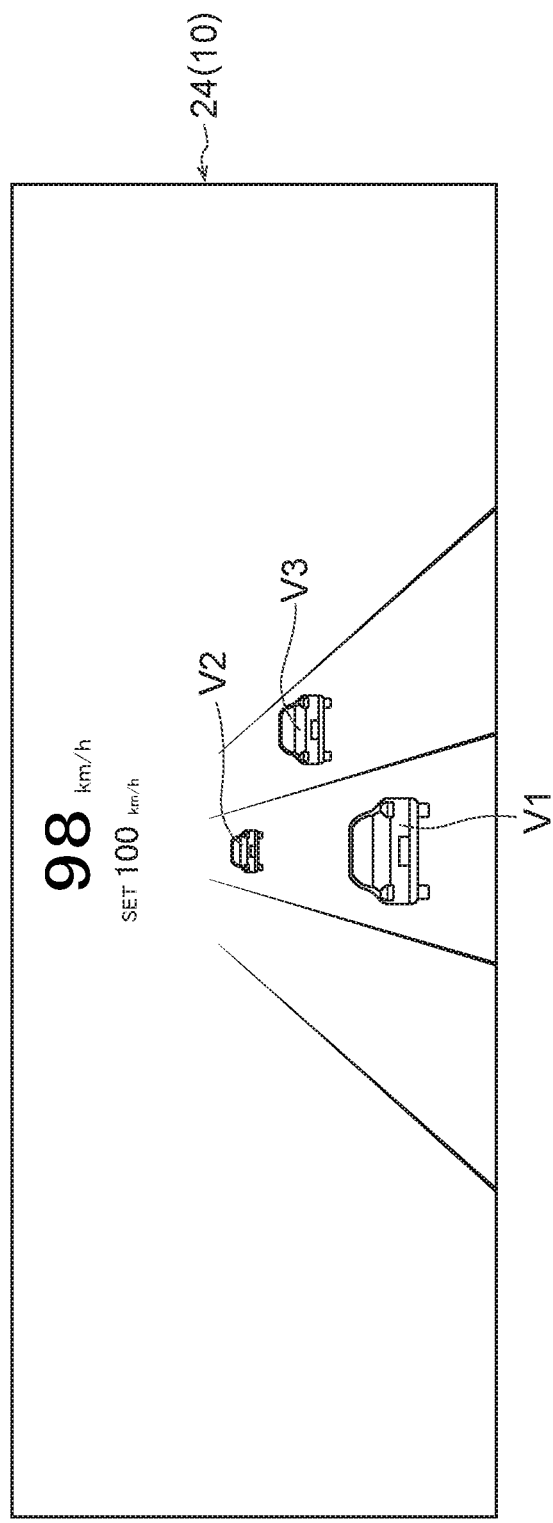

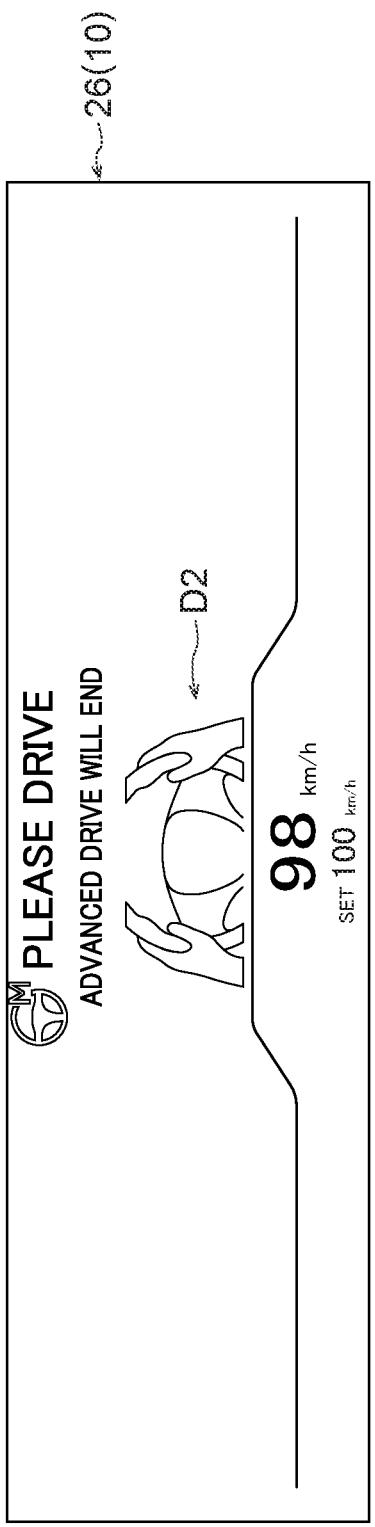

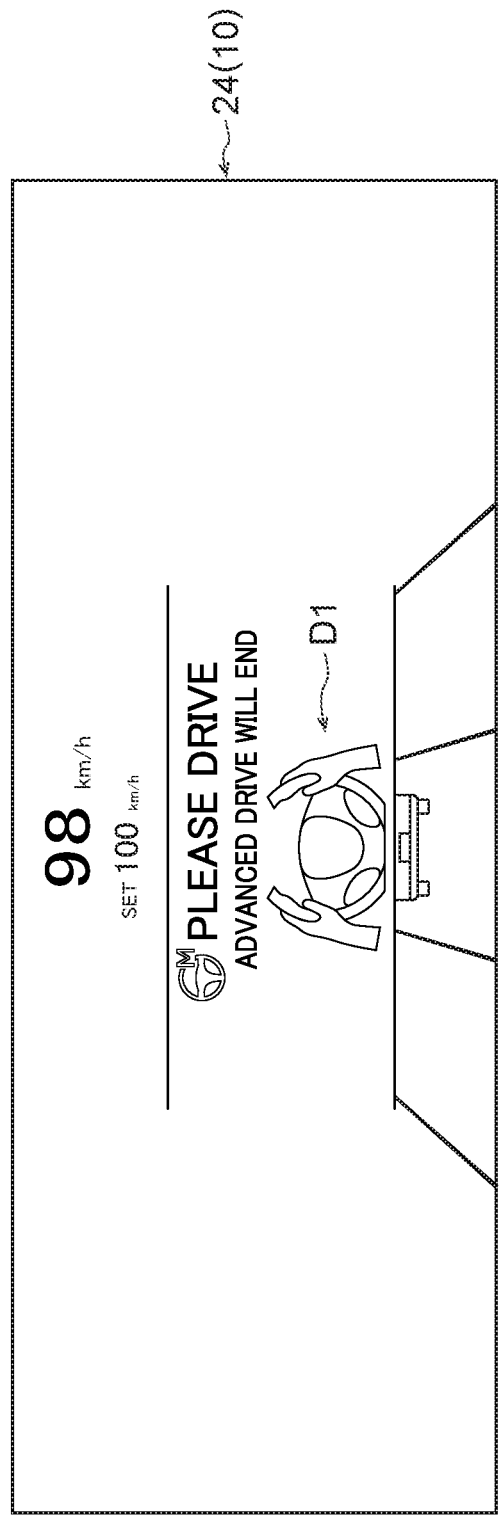

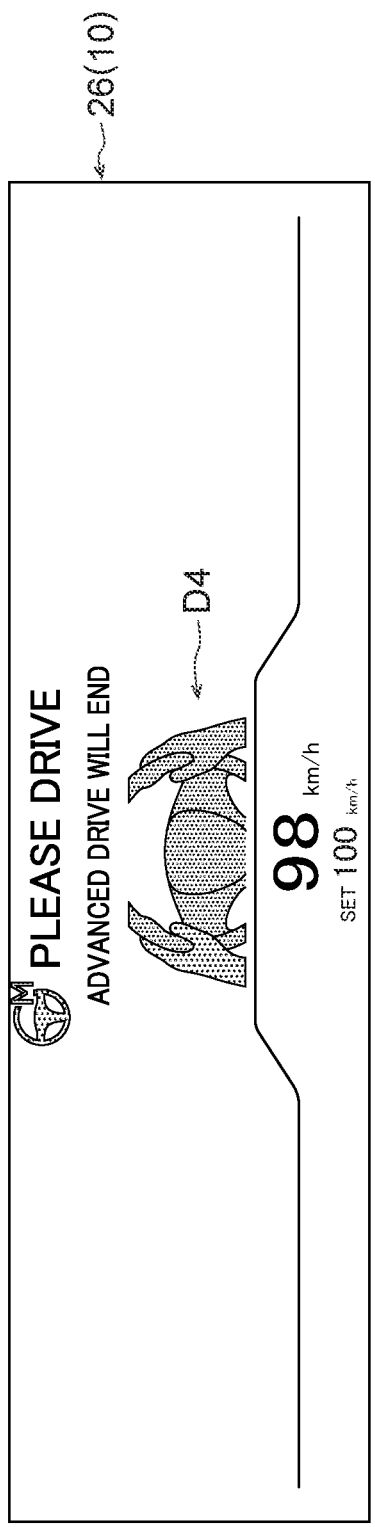

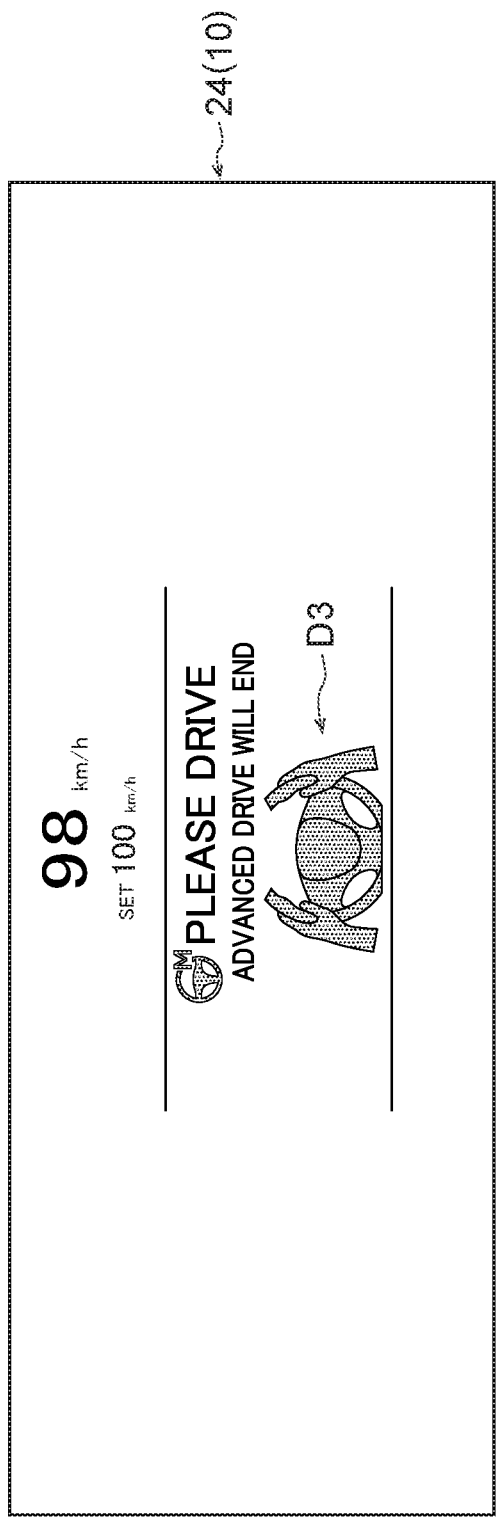

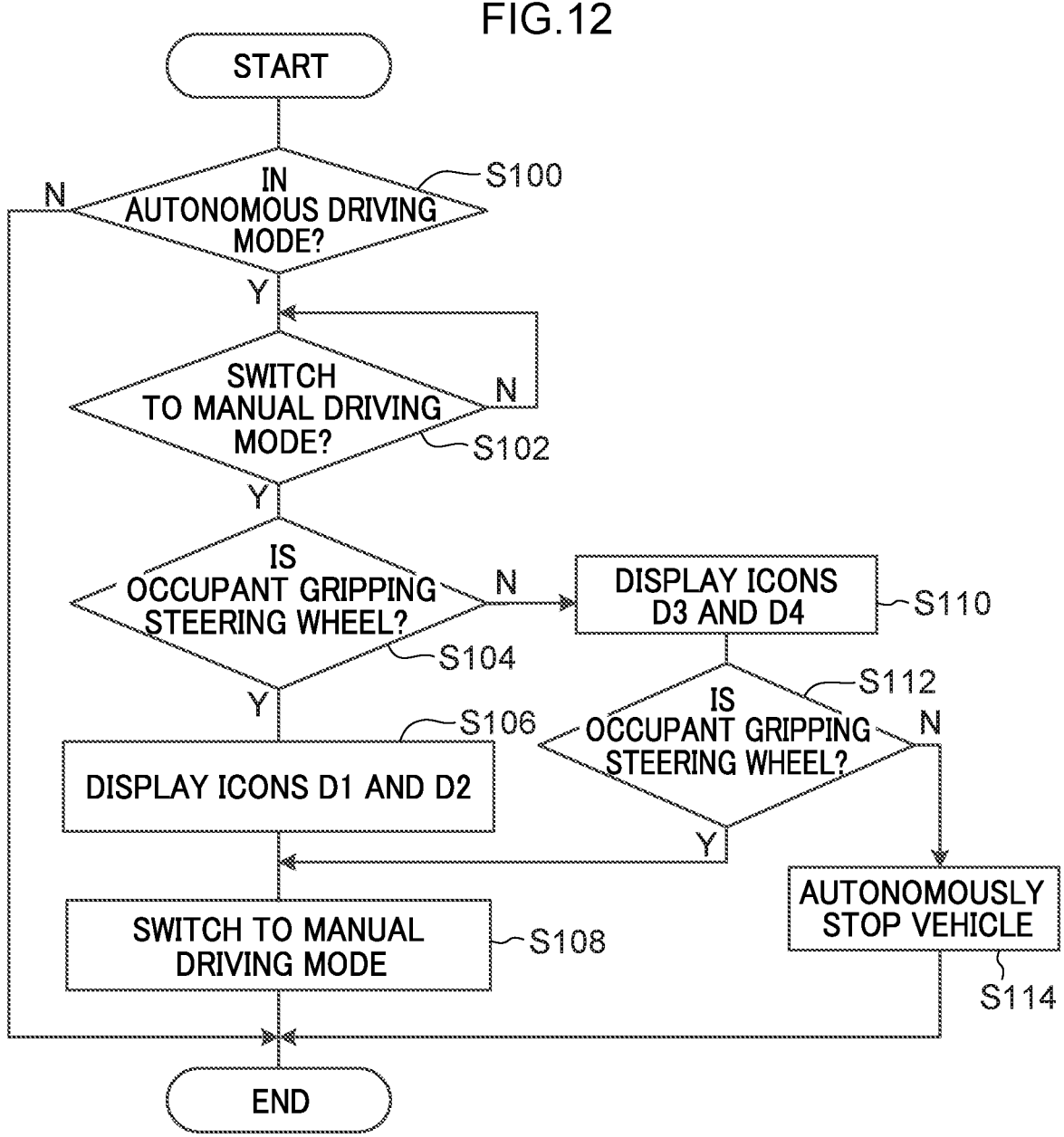

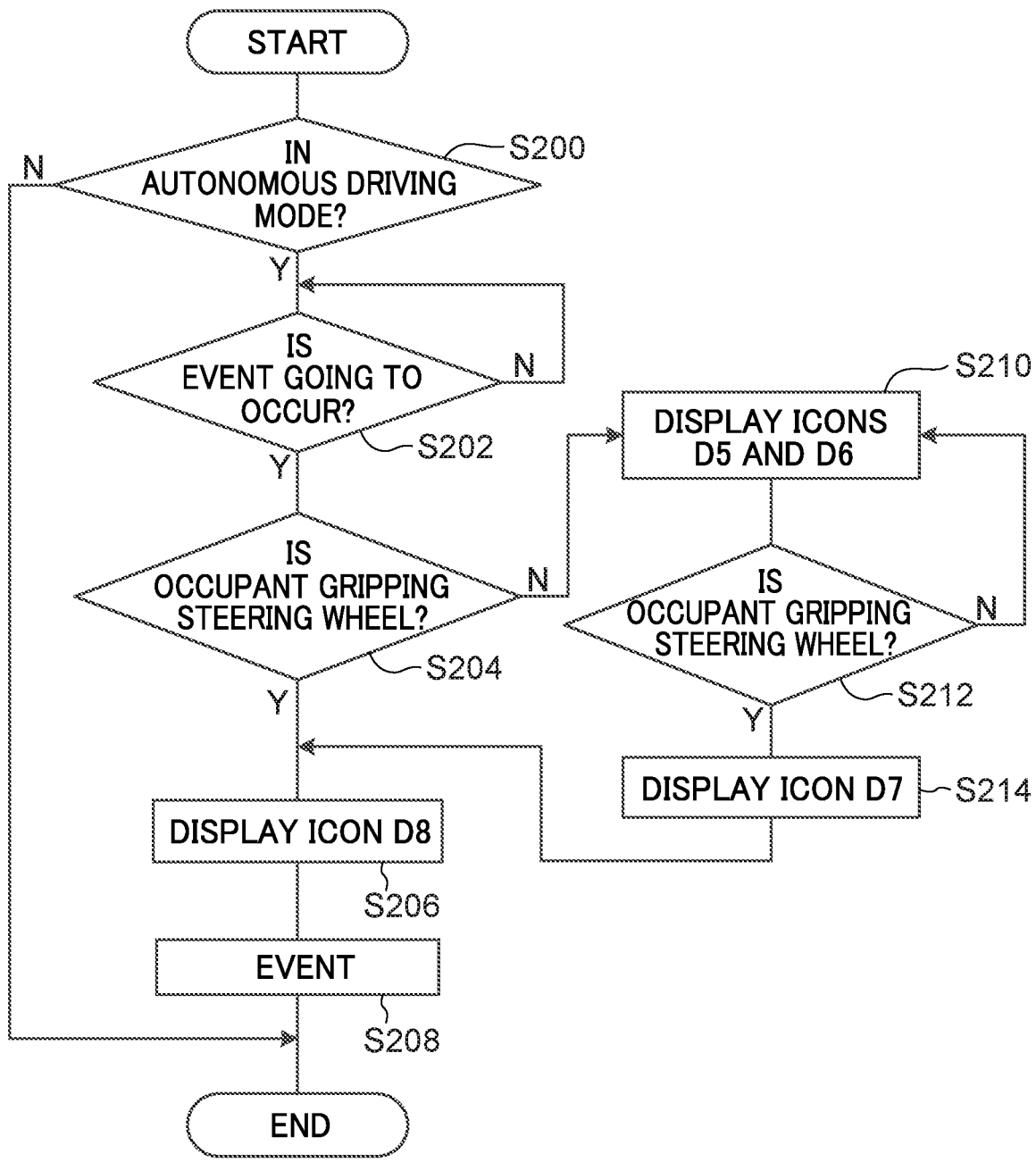

VEHICLE DISPLAY CONTROL DEVICE, VEHICLE DISPLAY SYSTEM, VEHICLE DISPLAY CONTROL METHOD, AND VEHICLE DISPLAY CONTROL PROGRAM

This application is a continuation application of U.S. patent application Ser. No. 17/372,719, filed on Jul. 12, 2021, which claims priority under 35 USC 119 from Japanese Patent Application No. 2020-146332 filed on Aug. 31, 2020. The disclosures of each of these applications are incorporated by reference herein in their entireties.

BACKGROUND

Technical Field

This invention relates to a vehicle display control device, a vehicle display system, a vehicle display control method, and a vehicle display control program.

Related Art

Japanese Patent Application Laid-open (JP-A) No. 2019-10929 discloses a technology relating to a driving assist system mounted in a vehicle such as an automobile. When, for example, the vehicle switches from an autonomous driving mode to a manual driving mode, the driver (occupant) needs to be notified in advance that the vehicle requests to switch driving modes. In this case, the related art disclosed in JP-A No. 2019-10929 largely displays an inducement image of a steering wheel with hands on it in the center portion of a meter display to induce the occupant to grip the steering wheel (a hands-on request). That is, the occupant is induced by this inducement image to grip the steering wheel, so the inducement image needs to be conspicuously displayed.

SUMMARY

However, because the request for the occupant to grip the steering wheel is conspicuously displayed as described above, if the request is frequently made, the occupant ends up feeling annoyed. Consequently, there is room for improvement in this regard.

In consideration of the above circumstances, this disclosure obtains a vehicle display control device, a vehicle display system, a vehicle display control method, and a vehicle display control program that can make an inducement image conspicuous in situations where the need for the occupant to grip the steering wheel is high and mitigate the annoyance of the inducement image in situations where the need for the occupant to grip the steering wheel is low.

A vehicle display control device of a first aspect of the disclosure includes a memory and a processor coupled to the memory, the processor is configured to cause a display unit provided in a vehicle cabin to display an inducement image requesting that an occupant grip a steering wheel in a case in which it is necessary for the occupant to grip the steering wheel. The processor causes the display unit to display the inducement image more prominently in a case of requesting that the occupant grip the steering wheel before the vehicle switches from an autonomous driving mode to a manual driving mode as the vehicle is continuing to drive autonomously, than in a case of requesting that the occupant continue to grip the steering wheel as the vehicle is continuing to drive autonomously.

The vehicle display control device of the first aspect includes the processor, and the processor causes the display unit provided in the vehicle cabin to display the inducement image requesting that the occupant grip the steering wheel in a case in which it is necessary for the occupant to grip the steering wheel.

The processor causes the display unit to display the inducement image more prominently in a case of requesting that the occupant grip the steering wheel before the vehicle switches from the autonomous driving mode to the manual driving mode as the vehicle is continuing to drive autonomously, than the inducement image in a case of requesting that the occupant continue to grip the steering wheel.

When the vehicle switches from the autonomous driving mode to the manual driving mode, the vehicle cannot be switched to the manual driving mode unless the occupant grips the steering wheel, so in this case the vehicle is forced to come to a stop. On the other hand, in a case of requesting that the occupant continue to grip the steering wheel as the vehicle is continuing to drive autonomously, the vehicle is not forced to come to a stop as a result of the occupant not gripping the steering wheel.

Consequently, the need for the occupant to grip the steering wheel is greater in a case of requesting that the occupant grip the steering wheel before the vehicle switches from the autonomous driving mode to the manual driving mode than in a case of requesting that the occupant continue to grip the steering wheel as the vehicle is continuing to drive autonomously.

In the first aspect, the processor causes the display unit to display the inducement image (first inducement image) more prominently (conspicuously) in a case of requesting that the occupant grip the steering wheel before the vehicle switches from the autonomous driving mode to the manual driving mode, than the inducement image (second inducement image) in a case of requesting that the occupant continue to grip the steering wheel as the vehicle is continuing to drive autonomously.

The first inducement image is made more conspicuous than the second inducement image. Because the second inducement image is less conspicuous than the first inducement image, in a case of requesting that the occupant continue to grip the steering wheel, the annoyance that the occupant may feel is mitigated.

It will be noted that examples of the "display unit" include a head-up display, a meter display, and a center display.

Furthermore, "display the inducement image more prominently" means making the inducement image more conspicuous by increasing the density or increasing the brightness of the inducement image, or making the inducement image more conspicuous by increasing a size of the inducement image or by means such as the position of the inducement image or causing the inducement image to flash on and off.

A vehicle display control device of a second aspect of the disclosure includes a memory and a processor coupled to the memory, the processor is configured to cause a display unit provided in a vehicle cabin to display an inducement image requesting that an occupant grip a steering wheel in a case in which it is necessary for the occupant to grip the steering wheel. The processor causes the display unit to display the inducement image more prominently in a case of requesting that the occupant grip the steering wheel before an occurrence of a vehicle event as the vehicle is continuing to drive autonomously than in a case of requesting that the occupant continue to grip the steering wheel.

The vehicle display control device of the second aspect includes the processor, and the processor causes the display unit provided in the vehicle cabin to display the inducement image requesting that the occupant grip the steering wheel in a case in which it is necessary for the occupant to grip the steering wheel.

Examples of the "vehicle event" include the vehicle merging, the vehicle changing lanes, and the vehicle approaching an intersection, and the processor causes the display unit to display the inducement image more prominently in a case of requesting that the occupant grip the steering grip before the occurrence of the vehicle event as the vehicle is continuing to drive autonomously, than the inducement image in a case of requesting that the occupant continue to grip the steering wheel.

In the vehicle event, the occupant does not know what will happen, so to prepare for unpredictable situations it becomes necessary to request that the occupant grip the steering wheel before the occurrence of the vehicle event. Additionally, the need to request that the occupant grip the steering wheel is greater in a case of requesting before the occurrence of the vehicle event, than in a case of requesting to continue to grip the steering wheel as the vehicle is continuing to drive autonomously.

The processor causes the display unit to display the inducement image (third inducement image) more prominently (conspicuously) in a case of requesting before the occurrence of the vehicle event, than the inducement image (second inducement image) in a case of requesting to continue to grip the steering wheel as the vehicle is continuing to drive autonomously.

In the second aspect, the third inducement image is made more conspicuous than the second inducement image. Because the second inducement image is less conspicuous than the third inducement image, in a case of requesting that the occupant continue to grip the steering wheel as the vehicle is continuing to drive autonomously, the annoyance that the occupant may feel is mitigated.

A vehicle display control device of a third aspect of the disclosure is the vehicle display control device of the first aspect, the processor is configured to cause the display unit to display the inducement image more prominently in a case of requesting that the occupant grip the steering wheel before an occurrence of a vehicle event as the vehicle is continuing to drive autonomously, than in a case of requesting that the occupant continue to grip the steering wheel.

In the vehicle display control device of the third aspect, the processor causes the display unit to display the inducement image more prominently in a case of requesting that the occupant grip the steering wheel before the occurrence of the vehicle event, than the inducement image in a case of requesting that the occupant continue to grip the steering wheel as the vehicle is continuing to drive autonomously.

In the third aspect, the need to request that the occupant grip the steering wheel is greater in a case of requesting before the occurrence of the vehicle event, than in a case of requesting to continue to grip the steering wheel as the vehicle is continuing to drive autonomously.

In the third aspect, the processor causes the display unit to display the inducement image (third inducement image) more prominently in a case of requesting before the occurrence of the vehicle event, than the inducement image (second inducement image) in a case of requesting to continue to grip the steering wheel as the vehicle is continuing to drive autonomously.

Because of this, the third inducement image is made more conspicuous than the second inducement image. Because the second inducement image is less conspicuous than the third inducement image, in a case of requesting that the occupant continue to grip the steering wheel as the vehicle is continuing to drive autonomously, the annoyance that the occupant may feel is mitigated.

A vehicle display control device of a fourth aspect of the disclosure is the vehicle display control device of the third aspect, the processor is configured to cause the display unit to display the inducement image more prominently in a case of requesting that the occupant grip the steering wheel before the vehicle switches from the autonomous driving mode to the manual driving mode as the vehicle is continuing to drive autonomously, than in a case of requesting that the occupant grip the steering wheel before the occurrence of a vehicle event.

When the vehicle switches from the autonomous driving mode to the manual driving mode, the vehicle cannot be switched to the manual driving mode unless the occupant grips the steering wheel, so in this case the vehicle is forced to come to a stop. On the other hand, the processor requests that the occupant grip the steering wheel before the occurrence of the vehicle event as the vehicle is continuing to drive autonomously, but in this case the potential for the vehicle to be forced to come to a stop as a result of the occupant not gripping the steering wheel is low.

Namely, the need to request that the occupant grip the steering wheel is greater in a case of requesting before the vehicle switches from the autonomous driving mode to the manual driving mode, than in a case of requesting before the occurrence of the vehicle event as the vehicle is continuing to drive autonomously.

In the vehicle display control device of the fourth aspect, the processor causes the display unit to display the inducement image (first inducement image) more prominently in a case of requesting before the vehicle switches from the autonomous driving mode to the manual driving mode, than the inducement image (third inducement image) in a case of requesting before the occurrence of the vehicle event as the vehicle is continuing to drive autonomously.

The first inducement image is made more conspicuous than the third inducement image. Namely, by changing the inducement image in accordance with the degree of the need for the occupant to grip the steering wheel, it becomes possible to make the inducement image more conspicuous in situations where the need for the occupant to grip the steering wheel is great.

A vehicle display control device of a fifth aspect of the disclosure is the vehicle display control device of any of the first aspect, the third aspect, and the fourth aspect, the processor is configured to calculate at least one of a distance or a time until the vehicle switches from the autonomous driving mode to the manual driving mode, and to cause the display unit to display the inducement image more prominently in a case in which the at least one of the distance or the time has become shorter than a preset threshold value, than in a case in which the at least one of the distance or the time is longer than the threshold value.

In the vehicle display control device of the fifth aspect, the processor calculates at least one of the distance or the time until the vehicle switches from the autonomous driving mode to the manual driving mode. Additionally, when the at least one of the distance or the time becomes shorter than the preset threshold value, the need to request that the occupant grip the steering wheel becomes greater than in a case in which the at least one of the distance or the time is longer than the preset threshold value.

The processor causes the display unit to display the inducement image (fourth inducement image) more prominently in a case in which the at least one of the distance or the time until the vehicle switches from the autonomous driving mode to the manual driving mode has become shorter than the preset threshold value, than the inducement image (fifth inducement image) in a case in which the at least one of the distance or the time is longer than the preset threshold value. Namely, it becomes possible to attract the occupant's attention by making the fourth inducement image more conspicuous than the fifth inducement image.

A vehicle display control device of a sixth aspect of the disclosure is the vehicle display control device of the second aspect or the fifth aspect, the processor calculates at least one of a distance or a time until the occurrence of a vehicle event and causes the display unit to display the inducement image more prominently in a case in which the at least one of the distance or the time has become shorter than a preset threshold value, than in a case in which the at least one of the distance or the time is longer than the threshold value.

In the vehicle display control device of the sixth aspect, the processor calculates at least one of the distance or the time until the occurrence of a vehicle event as the vehicle is continuing to drive autonomously. Additionally, when the at least one of the distance or the time becomes shorter than the preset threshold value, the need to request that the occupant grip the steering wheel becomes greater than in a case in which the at least one of the distance or the time is longer than the preset threshold value.

The processor causes the display unit to display the inducement image (fourth inducement image) more prominently in a case in which the at least one of the distance or the time until the occurrence of a vehicle event has become shorter than the preset threshold value, than the inducement image (fifth inducement image) in a case in which the at least one of the distance or the time is longer than the preset threshold value. Namely, it becomes possible to attract the occupant's attention by making the fourth inducement image more conspicuous than the fifth inducement image.

A vehicle display control device of a seventh aspect of the disclosure is the vehicle display control device of any of the first aspect to the sixth aspect, the processor is configured to cause the display unit to display the inducement image more prominently in a case of requesting that the occupant grip the steering wheel, than in a case of requesting that the occupant continue to grip the steering wheel by increasing a size of the inducement image, increasing a brightness of the inducement image, or displaying the inducement image in a conspicuous position.

In the vehicle display control device of the seventh aspect, the inducement image can be made more prominent by making the size of the inducement image larger in s case of requesting that the occupant grip the steering wheel than in s case of requesting that the occupant continue to grip the steering wheel. In addition to this, the inducement image can also be made more prominent by increasing the brightness of the inducement image and/or displaying the inducement image in a conspicuous position.

A vehicle display system of an eighth aspect of the disclosure includes: the vehicle display control device of the first aspect; and a display unit that is provided in the vehicle cabin and displays an inducement image requesting that the occupant grip the steering wheel.

The vehicle display system of the eighth aspect includes the vehicle display control device and the display unit. In the vehicle display control device, the processor causes the display unit to display the inducement image more prominently in a case of requesting that the occupant grip the steering wheel before the vehicle switches from the autonomous driving mode to the manual driving mode as the vehicle is continuing to drive autonomously, than the inducement image in a case of requesting that the occupant continue to grip the steering wheel. In a case in which it is necessary for the occupant to grip the steering wheel, the inducement image r is displayed on the display unit provided in the cabin.

The processor can cause the display unit to display the inducement image (first inducement image) more prominently (conspicuously) in a case of requesting before the vehicle switches from the autonomous driving mode to the manual driving mode, than the inducement image (second inducement image) in a case of requesting to continue to grip the steering wheel as the vehicle is continuing to drive autonomously.

Because the second inducement image is less conspicuous than the first inducement image, in a case of requesting that the occupant continue to grip the steering wheel, the annoyance that the occupant may feel is mitigated.

A vehicle display system of a ninth aspect of the disclosure includes: the vehicle display control device of the second aspect; and a display unit that is provided in the vehicle cabin and displays an inducement image requesting that the occupant grip the steering wheel.

The vehicle display system of the ninth aspect includes the vehicle display control device and the display unit. In the vehicle display control device, the processor causes the display unit to display the inducement image more prominently in a case of requesting that the occupant grip the steering wheel before the occurrence of a vehicle event as the vehicle is continuing to drive autonomously, than the inducement image in a case of requesting that the occupant continue to grip the steering wheel. In a case in which it is necessary for the occupant to grip the steering wheel, the inducement image is displayed on the display unit provided in the cabin.

The processor can cause the display unit to display the inducement image (third inducement image) more prominently (conspicuously) in a case of requesting before the occurrence of the vehicle event, than the inducement image (second inducement image) in a case of requesting to continue to grip the steering wheel as the vehicle is continuing to drive autonomously.

Because the second inducement image is less conspicuous than the third inducement image, in a case of requesting that the occupant continue to grip the steering wheel, the annoyance that the occupant may feel is mitigated.

A vehicle display control method of a tenth aspect of the disclosure includes executing processing by a computer, the processing including displaying an inducement image more prominently in a case of requesting that an occupant grip a steering wheel before the vehicle switches from an autonomous driving mode to a manual driving mode as the vehicle is continuing to drive autonomously, than in a case of requesting that the occupant continue to grip the steering wheel.

The vehicle display control method of the tenth aspect can make it easier for the occupant to recognize, in accordance with the degree of importance, the need for the occupant to grip the steering wheel.

A vehicle display control method of an eleventh aspect of the disclosure includes executing processing by a computer, the processing including displaying an inducement image more prominently in a case of requesting that an occupant grip a steering wheel before an occurrence of a vehicle event as the vehicle is continuing to drive autonomously, than in a case of requesting that the occupant continue to grip the steering wheel.

The vehicle display control method of the eleventh aspect can make it easier for the occupant to recognize, in accordance with the degree of importance, the need for the occupant to grip the steering wheel.

A non-transitory storage medium storing a vehicle display control program of a twelfth aspect of the disclosure executable by a computer to perform processing, the processing including displaying an inducement image more prominently in a case of requesting that an occupant grip a steering wheel before the vehicle switches from an autonomous driving mode to a manual driving mode as the vehicle is continuing to drive autonomously, than in a case of requesting that the occupant continue to grip the steering wheel.

The vehicle display control program of the twelfth aspect can make it easier for the occupant to recognize, in accordance with the degree of importance, the need for the occupant to grip the steering wheel.

A non-transitory storage medium storing a vehicle display control program of a thirteenth aspect of the disclosure executable by a computer to perform processing, the processing including displaying an inducement image more prominently in a case of requesting that an occupant grip a steering wheel before the occurrence of a vehicle event as the vehicle is continuing to drive autonomously, than in a case of requesting that the occupant continue to grip the steering wheel.

The vehicle display control program of the thirteenth aspect can make it easier for the occupant to recognize, in accordance with the degree of importance, the need for the occupant to grip the steering wheel.

As described above, the vehicle display control device, the vehicle display system, the vehicle display control method, and the non-transitory storage medium storing the vehicle display control program pertaining to the disclosure have excellent effects in that they can make the inducement image more conspicuous in situations where the need for the occupant to grip the steering wheel is great and mitigate the annoyance of the inducement image that the occupant may feel in situations where the need for the occupant to grip the steering wheel is small.

BRIEF DESCRIPTION OF THE DRAWINGS

A preferred embodiment will be described in detail based on the following figures, wherein:

FIG. 3 is a block diagram showing functional configurations of the vehicle display control device pertaining to the embodiment of the disclosure;

FIG. 4A is a front view showing an example display on a HUD during normal driving of the vehicle to which the vehicle display control device pertaining to the embodiment of the disclosure has been applied;

FIG. 4B is a front view showing an example display on a MET during normal driving of the vehicle to which the vehicle display control device pertaining to the embodiment of the disclosure has been applied;

FIG. 5A is a front view showing an example display, on the HUD, of an icon D2 representing a hands-on request that is made before the driving mode is switched from an autonomous driving mode to a manual driving mode in the vehicle to which the vehicle display control device pertaining to the embodiment of the disclosure has been applied;

FIG. 5B is a front view showing an example display, on the MET, of an icon D1 representing the hands-on request that is made before the driving mode is switched from the autonomous driving mode to the manual driving mode in the vehicle to which the vehicle display control device pertaining to the embodiment of the disclosure has been applied;

FIG. 6A is a front view showing an example display, on the HUD, of an icon D4 representing the hands-on request that is made before the driving mode is switched from the autonomous driving mode to the manual driving mode in the vehicle to which the vehicle display control device pertaining to the embodiment of the disclosure has been applied;

FIG. 6B is a front view showing an example display, on the MET, of an icon D3 representing the hands-on request that is made before the driving mode is switched from the autonomous driving mode to the manual driving mode in the vehicle to which the vehicle display control device pertaining to the embodiment of the disclosure has been applied;

FIG. 12 is a flowchart showing an example of a flow of a display process in the embodiment of the disclosure; and FIG. 13 is a flowchart showing an example of a flow of a display process in the embodiment of the disclosure.

DETAILED DESCRIPTION

A vehicle 12 to which a vehicle display control device 10 pertaining to an embodiment of the disclosure has been applied will now be described with reference to the drawings. It will be noted that the vehicle 12 of this embodiment is configured to be switchable between an autonomous driving mode and a manual driving mode. Here, the autonomous driving mode is a vehicle driving mode in which some or all driving operations (operations such as operations of the accelerator, brakes, turn signal, steering wheel, and pedals) are performed autonomously. Furthermore, the manual driving mode is a vehicle driving mode in which a driver executes all the driving operations.

Figure 1:
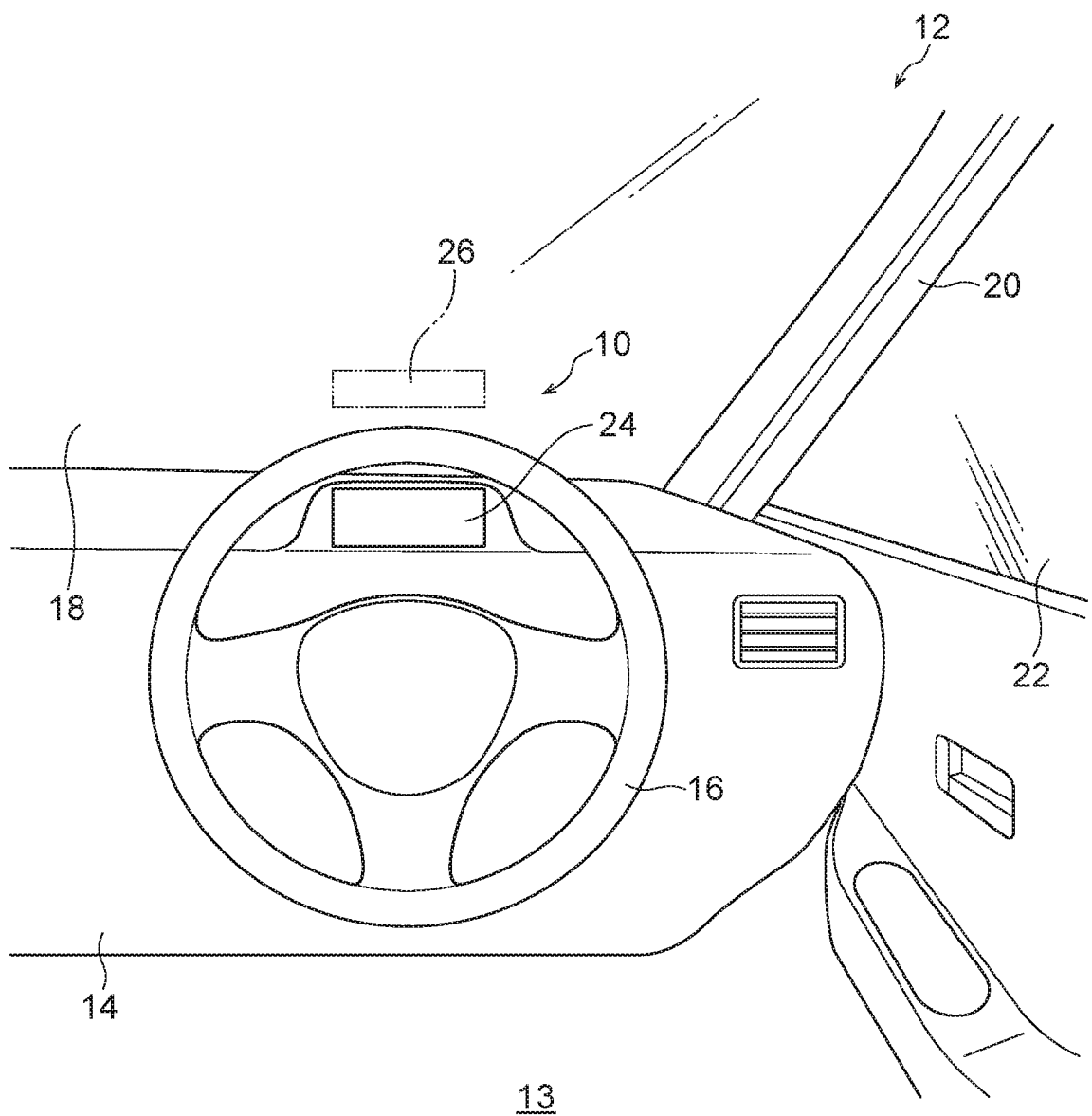
FIG. 1 is a schematic perspective view, seen from a vehicle rear direction, of a front portion of a cabin in a vehicle to which a vehicle display control device pertaining to the embodiment of the disclosure has been applied.

As shown in FIG. 1, the vehicle 12 has a cabin 13, and an instrument panel 14 is provided in the front portion of the cabin 13. The instrument panel 14 extends in the vehicle width direction, and a steering wheel 16 is provided on the vehicle right side of the instrument panel 14. That is, in this embodiment, as an example, the vehicle 12 is a right-hand drive vehicle where the steering wheel 16 is provided on the right side, and the driver's seat is set on the vehicle right side. Furthermore, a windshield glass 18 is provided at the front end portion of the instrument panel 14.

The windshield glass 18 extends in the vehicle upward direction from the front end portion of the instrument panel 14 and divides the inside of the cabin 13 from the outside. Furthermore, both vehicle width direction end portions of the windshield glass 18 are attached to front end portions of front pillars 20, and front end portions of front side glasses 22 are secured to rear end portions of the front pillars 20. Moreover, a vehicle upper end portion of the windshield glass 18 is attached to a front header panel (not shown in the drawings), which is disposed with its lengthwise direction coinciding with the vehicle width direction at the front end of a roof panel (not shown in the drawings) that covers the cabin 13 from above.

In the instrument panel 14, a meter display (a display unit; hereinafter called "the MET") 24 is provided in back of the steering wheel 16 in a position in the field of view of a driver (occupant) when the driver's line of sight is directed in the vehicle forward direction.

At the windshield glass 18, a head-up display (a display unit; hereinafter called "the HUD") 26 is provided. The HUD 26 is set on the vehicle upper side of the MET 24 and is configured by a plane of projection projected by a head-up display device 44 (see FIG. 2). It will be noted that the head-up display device 44 is provided more in the vehicle forward direction than the instrument panel 14 and is configured so that images are projected from the head-up display device 44 to the HUD 26 at the windshield glass 18.

Hardware Configurations of Vehicle Display Control Device 10

Figure 2:
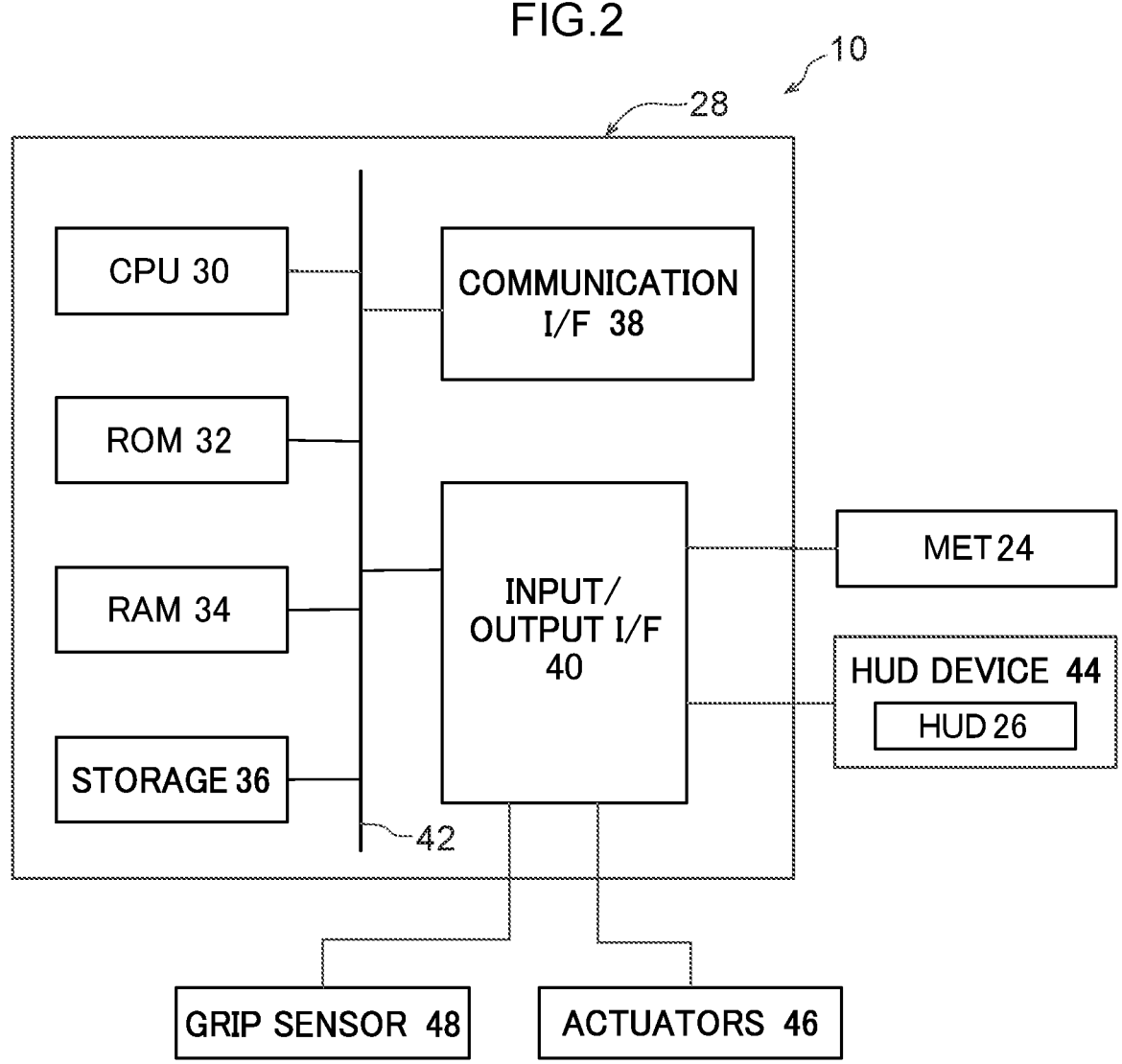
FIG. 2 is a block diagram showing hardware configurations of the vehicle display control device pertaining to the embodiment of the disclosure.

The vehicle 12 is provided with an electronic control unit (ECU) 28 serving as a control unit of the vehicle display control device 10. FIG. 2 is a block diagram showing hardware configurations of the vehicle display control device 10.

As shown in FIG. 2, the ECU 28 of the vehicle display control device 10 is configured to include a central processing unit (CPU; processor) 30, a read-only memory (ROM) 32, a random-access memory (RAM) 34, a storage 36, a communication interface (communication I/F) 38, and an input/output interface (input/output I/F) 40. These configurations are communicably connected to each other via a bus 42.

The CPU 30 is a central processing unit and, for example, executes a vehicle display control program and controls the parts of the ECU 28. That is, the CPU 30 reads the vehicle display control program from the ROM 32 or the storage 36 and executes the vehicle display control program using the RAM 34 as a work area. The CPU 30 controls the above configurations and performs various types of processing in accordance with the vehicle display control program recorded in the ROM 32 or the storage 36.

The ROM 32 stores the vehicle display control program and various types of data. The RAM 34 temporarily stores the vehicle display control program or the data as a work area. The storage 36 is configured by a hard disk drive (HDD) or a solid-state drive (SSD) and stores the vehicle display control program, including an operating system, and various types of data. In this embodiment, the vehicle display control program for performing display processes and various types of data are stored in the ROM 32 or the storage 36.

The communication I/F 38 is an interface for the vehicle display control device 10 to communicate with servers and other devices not shown in the drawings, and a standard such as Ethernet (registered trademark), LTE, FDDI, or Wi-Fi (registered trademark), for example, is used.

Connected to the input/output I/F 40 are the MET 24, the head-up display device (HUD device) 44 that projects images on the HUD 26, actuators 46, and a grip sensor 48. Furthermore, connected to the input/output I/F 40 are sensors and a GPS device (not shown in the drawings) for allowing the vehicle 12 (see FIG. 1) to drive autonomously.

Here, the actuators 46 are configured to include a steering actuator, an accelerator actuator, and a brake actuator. The steering actuator steers the vehicle 12, and the accelerator actuator accelerates the vehicle 12. Furthermore, the brake actuator decelerates the vehicle 12 by controlling the brakes.

The grip sensor 48 is capable of detecting that the steering wheel 16 has been gripped by the occupant. Examples of the grip sensor 48 include a pressure sensor capable of detecting pressure that acts on the steering wheel 16 when the steering wheel 16 has been gripped by the occupant. In addition to this, a contact sensor capable of detecting contact by the occupant on the steering wheel 16, or a vitals sensor capable of detecting the pulse, blood pressure, and perspiration of the occupant when the occupant has gripped the steering wheel 16, may also be used as the grip sensor 48.

Functional Configurations of Vehicle Display Control Device 10

The vehicle display control device 10 uses the above hardware resources to realize various functions. The functional configurations that the vehicle display control device 10 realizes will now be described with reference to FIG. 3.

As shown in FIG. 3, the vehicle display control device 10 is configured to include, as functional configurations, a communication unit 50, an autonomous driving control unit 54, a MET display instruction unit 56, a HUD display instruction unit 58, a grip determination unit 60, and a display control unit 62. It will be noted that these functional configurations are realized as a result of the CPU 30 shown in FIG. 2 reading and executing the vehicle display control program stored in the ROM 32 or the storage 36.

The communication unit 50 sends data to, and receives data from, outside servers and other devices via the communication I/F 38 (see FIG. 2). For example, the communication unit 50 sends and receives data such as traffic conditions and map data stored in the servers. Furthermore, the communication unit 50 may also be configured to perform vehicle-to-vehicle communication with vehicles that are running in surrounding area.

The autonomous driving control unit 54 allows the vehicle 12 to drive autonomously while taking into account position information and environmental information about the area around the vehicle 12 (see FIG. 1). Specifically, the autonomous driving control unit 54 allows the vehicle 12 to drive autonomously by controlling the actuators 46 (see FIG. 2). Furthermore, the autonomous driving control unit 54 switches the driving mode between the autonomous driving mode and the manual driving mode of the vehicle 12.

The MET display instruction unit 56 causes the MET 24 (see FIG. 2) to display a third-person multi-lane display image. The third-person multi-lane display image is an image in which the host vehicle is seen in a bird's eye view from above and behind and which displays the host vehicle's lane and the lanes adjacent thereto on the right and left. Nonexistent lanes are excluded from being displayed, so in typical conditions there are a maximum of three lanes displayed in the third-person multi-lane display image, though this is not intended to limit the third-person multi-lane display image. In the third-person multi-lane display image, the host vehicle is displayed by an icon. The third-person multi-lane display image can display a situation where, for example, there is another vehicle approaching and the host vehicle defers changing lanes, as in a situation where the host vehicle is about to change lanes but there is another vehicle approaching from the rear right or the rear left and so the host vehicle defers changing lanes until the other vehicle passes and then the host vehicle changes lanes.

In FIG. 4B, an example display on the MET 24 during normal driving of the vehicle 12 is shown. As shown in FIG. 4B, in the upper portion of the display region of the MET 24, a set speed when driving in cruise control and the current speed of the vehicle 12 are displayed. The set speed and the vehicle speed are displayed in the vehicle width direction center portion of the display region of the MET 24. The set speed is displayed small under the vehicle speed, and here it is set to a speed of 100 km/h as an example. Furthermore, the current vehicle speed is displayed above the set speed, and here a speed of 98 km/h is displayed. The vehicle 12 is set to drive at a speed of up to 100 km/h while maintaining a fixed inter vehicle distance from the vehicle in front.

Furthermore, an icon V1 that simulates the host vehicle and an icon V2 and an icon V3 that simulate area vehicles are displayed in the center portion of the display region of the MET 24. By looking at the icon V1, one can see that the host vehicle is driving in a middle lane among three driving lanes. Furthermore, the icon V2 and the icon V3 are each displayed based on information detected by sensors (not shown in the drawings) mounted in the vehicle 12. Additionally, by looking at the icon V2 and the icon V3, one can see that there is a vehicle driving in front of the host vehicle and a vehicle driving diagonally to the right and in front of the host vehicle.

It will be noted that the position of the host vehicle can be detected by the GPS device mounted in the vehicle 12. Furthermore, as the sensors that detect the area vehicles, a combination of sensors such as stereo cameras, ultrasonic sensors, millimeter wave sensors, and laser radar may also be used. In addition, the vehicle display control device 10 may also be configured to be able to grasp the position of the host vehicle and the positions of the area vehicles by performing vehicle-to-vehicle communication with the area vehicles.

The HUD display instruction unit 58 causes the HUD 26 (see FIG. 2) to display a first-person single-lane display image. The first-person single-lane display image is an image close to what the driver sees in the forward direction through the windshield glass of the host vehicle, and adjacent lanes on the right and left of the host vehicle's lane are excluded from being displayed. The first-person single-lane display image is an image in which the host vehicle's lane is displayed as large as possible and in which intrusiveness is minimized by not displaying information that is not important for monitoring driving.

In FIG. 4A, an example display on the HUD 26 during normal driving of the vehicle 12 is shown. As shown in FIG. 4A, in the lower portion of the display area of the HUD 26, the set speed when driving in cruise control and the current speed of the vehicle 12 are displayed. The set speed and the vehicle speed are displayed in the vehicle width direction center portion of the display region of the HUD 26.

The vehicle 12 is set to drive at a speed of up to 100 km/h while maintaining a fixed inter vehicle distance from the vehicle in front. It will be noted that the display of the set speed and the vehicle speed are synchronized with the content on the MET 24. Furthermore, on the HUD 26, only the icon V2 simulating the vehicle driving in front of the host vehicle is displayed.

The grip determination unit 60 determines whether or not the occupant is gripping the steering wheel 16 (see FIG. 1) based on the output of the grip sensor 48 (see FIG. 2). For example, in a case in which the grip sensor 48 is a pressure sensor, the grip determination unit 60 determines whether or not the occupant is gripping the steering wheel 16 based on the pressure detected by the grip sensor 48 when the occupant has gripped the steering wheel 16.

Additionally, the grip determination unit 60 outputs information representing the determination result to the display control unit 62.

The display control unit 62 causes the MET 24 and the HUD 26 to display an inducement image that induces the occupant to grip the steering wheel 16 as needed based on the determination result of the grip determination unit 60. For example, before the vehicle 12 is switched from the autonomous driving mode to the manual driving mode as the vehicle 12 is continuing to drive autonomously, it is necessary to request that the occupant grip the steering wheel 16, that is, make a hands-on request to the occupant.

As shown in FIG. 5A and FIG. 5B, the display control unit 62 causes an icon D1 (first inducement image) and an icon D2 (first inducement image) of a steering wheel gripped with both hands to be respectively displayed in the center portions of the display regions of the MET 24 and the HUD 26 to thereby induce the occupant to grip the steering wheel 16.

In this way, because the display control unit 62 causes the MET 24 and the HUD 26 to respectively display the icons D1 and D2 of a steering wheel gripped with both hands, the need to grip the steering wheel 16 can be visually impressed upon the occupant, and it becomes possible to make the occupant understand at a glance what is being communicated.

Moreover, the display control unit 62 causes the MET 24 and the HUD 26 to display specific messages above the icons D1 and D2, such as "Please drive" and "Advanced Drive will end." It will be noted that the icons D1 and D2 are displayed on the MET 24 and the HUD 26 even in a state in which the occupant is gripping the steering wheel 16.

Additionally, in a case in which at least one of a distance and a time until the vehicle 12 is switched from the autonomous driving mode to the manual driving mode has become equal to or less than a predetermined value (threshold value), if the occupant still has not gripped the steering wheel 16, the icons D1 and D2 shown in FIG. 5A and FIG. 5B change respectively to icons D3 and D4 shown in FIG. 6A and FIG. 6B. Namely, the inducement image changes to the icons D3 and D4, which are more conspicuous than the icons D1 and D2.

The difference between the icons D1 and D2 and the icons D3 and D4 is specifically as follows. In this embodiment, as shown in FIG. 5A and FIG. 5B, in the icons D1 and D2 the steering wheel and hands are in outline, but in the icons D3 and D4 shown in FIG. 6A and FIG. 6B the steering wheel and hands are colored (e.g., filled in with a conspicuous color, such as an amber color or a fluorescent color). Namely, by changing the color of the steering wheel and hands, the icons D3 and D4 are made more conspicuous than the icons D1 and D2. It will be noted that the icons D3 and D4 may also be made to flash on and off rather than be colored.

Additionally, in this embodiment, the display control unit 62 causes the MET 24 and the HUD 26 to display the icons D1 to D4 in a case of requesting that the occupant grip the steering wheel 16 before the vehicle 12 switches from the autonomous driving mode to the manual driving mode more prominently than an icon D8 (second inducement image; see FIG. 11) in a case of requesting that the occupant continue to grip the steering wheel 16 as the vehicle 12 is continuing to drive autonomously. It will be noted that although just an example display on the MET 24 is shown in FIG. 11, a display that is substantially the same as that on the MET 24 is also shown on the HUD 26. The same holds true in FIG. 8 to FIG. 10.

Furthermore, the display control unit 62 also causes the MET 24 and the HUD 26 to display icons D5 and D6 (third inducement images; see FIG. 8) and an icon D7 (third inducement image; see FIG. 10) in a case of requesting that the occupant grip the steering wheel 16 before the occurrence of a vehicle event—such as the vehicle 12 merging, the vehicle 12 changing lanes, and the vehicle 12 approaching an intersection—as the vehicle 12 is continuing to drive autonomously more prominently than the icon D8 (second inducement image; see FIG. 11) requesting that the occupant continue to grip the steering wheel 16 as the vehicle 12 is continuing to drive autonomously.

Figure 7:
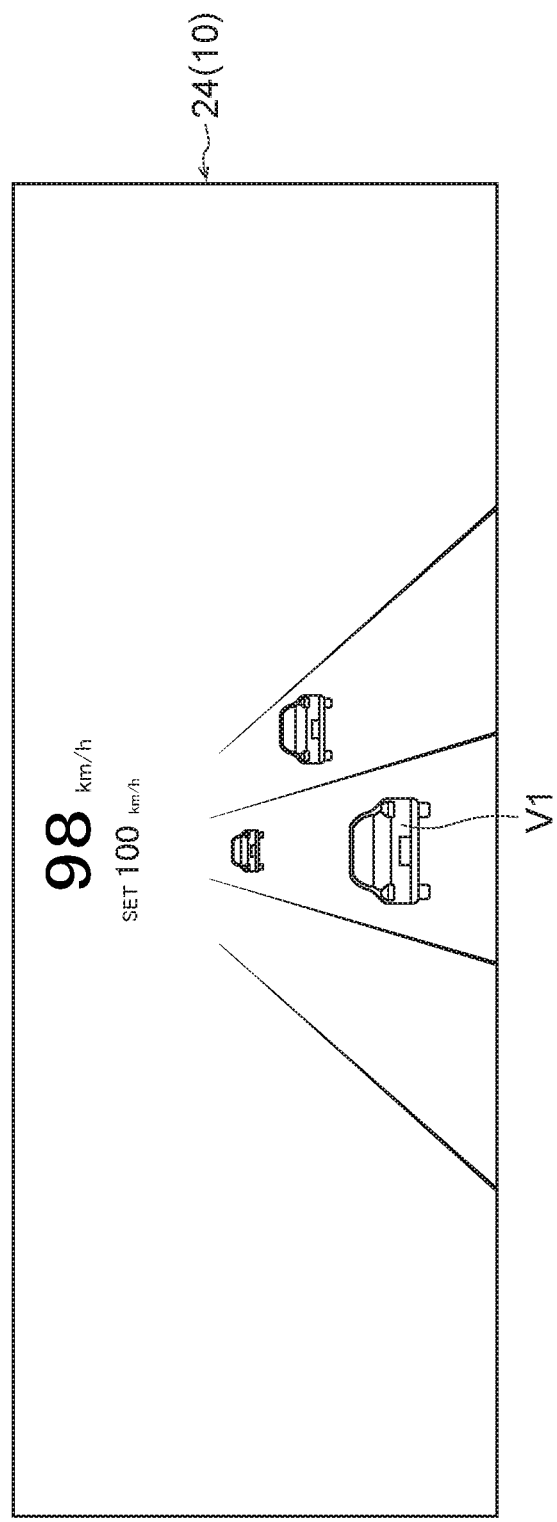
FIG. 7 is a front view showing an example display on the MET during normal driving of the vehicle to which the vehicle display control device pertaining to the embodiment of the disclosure has been applied.

For example, FIG. 7 to FIG. 11 show example displays on the MET 24. FIG. 7 shows an example display on the MET 24 during normal driving in the autonomous driving mode, and during normal driving in the autonomous driving mode an icon of the steering wheel is not displayed.

Figure 8:
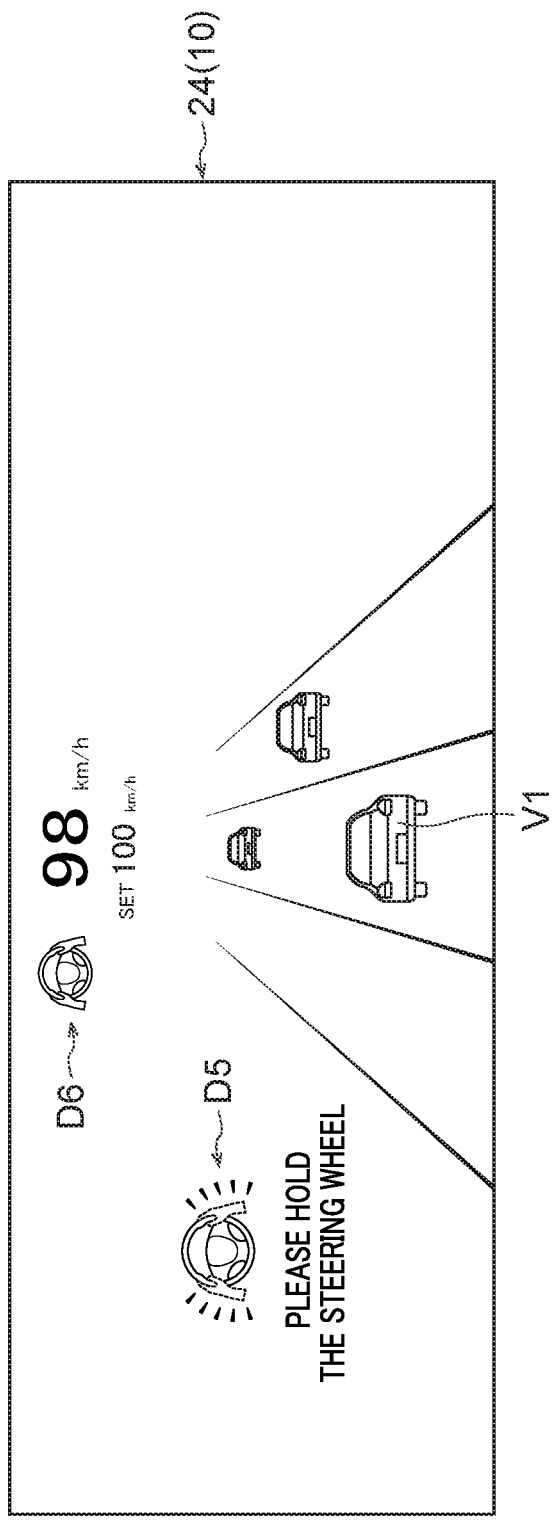
FIG. 8 is a front view showing an example display, on the MET, of icons D5 and D6 representing a hands-on request that is made before a vehicle event to which the vehicle display control device pertaining to the embodiment of the disclosure has been applied.
Figure 9:
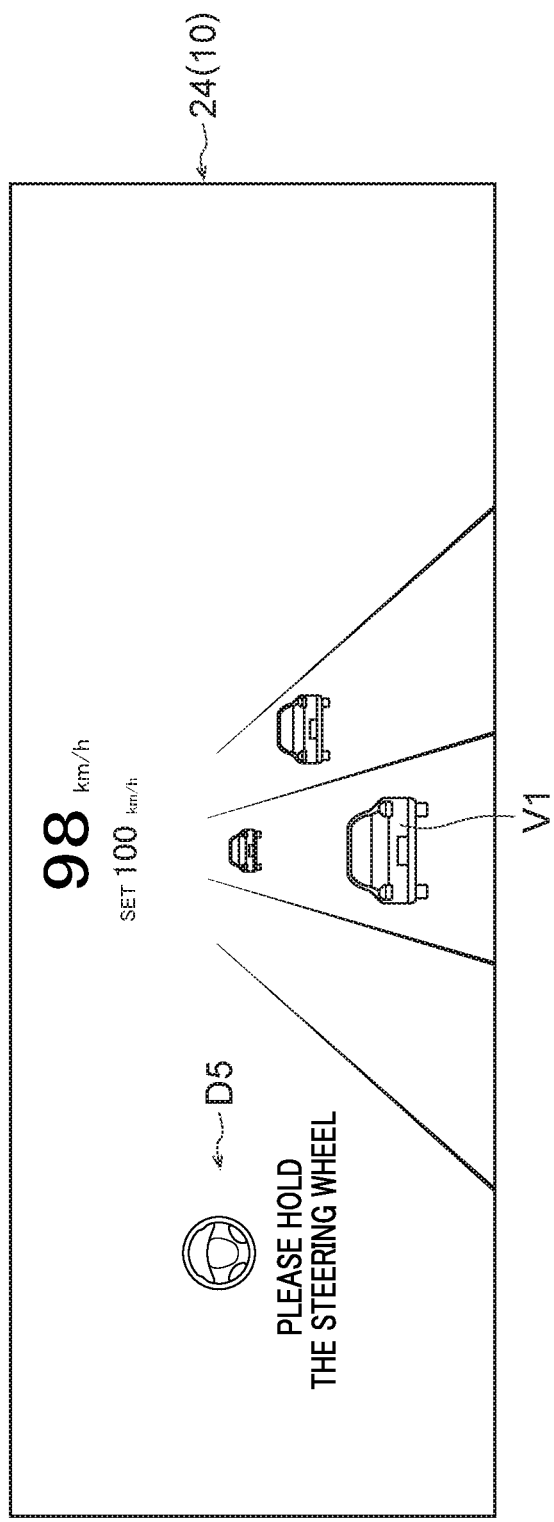
FIG. 9 is a front view showing an example display, on the MET, of the icon D5 representing the hands-on request that is made before a vehicle event to which the vehicle display control device pertaining to the embodiment of the disclosure has been applied.

In a case in which it is necessary for the occupant to grip the steering wheel 16, such as before the occurrence of the vehicle event, as shown in FIG. 8 and FIG. 9, the display control unit 62 causes the MET 24 to display the icons D5 and D6 requesting that the occupant grip the steering wheel 16. Furthermore, the display control unit 62 causes the MET 24 to display the message "Please hold the steering wheel."

It will be noted that the icon D5 is displayed on the left side of the third-person multi-lane display image displayed in the center portion of the display region of the MET 24 and that the icon D6 is displayed on the left side of the display of the current speed of the vehicle 12 displayed at the upper portion of the display region of the MET 24. Furthermore, in the icon D5 the hands flash on and off, and in the icon D6 the icon itself flashes on and off. It will be noted that FIG. 8 and FIG. 9 are alternately displayed.

Figure 10:
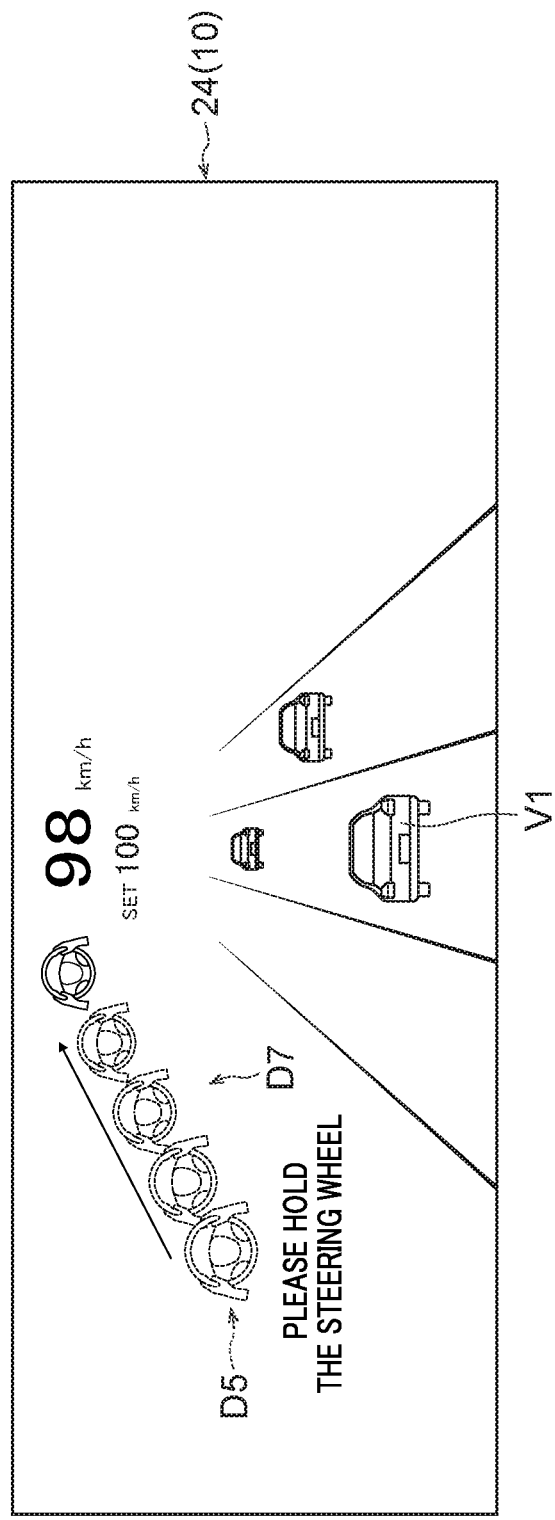
FIG. 10 is a front view showing an example display, on the MET, of an icon D7 representing the hands-on request that is made before a vehicle event to which the vehicle display control device pertaining to the embodiment of the disclosure has been applied.
Figure 11:
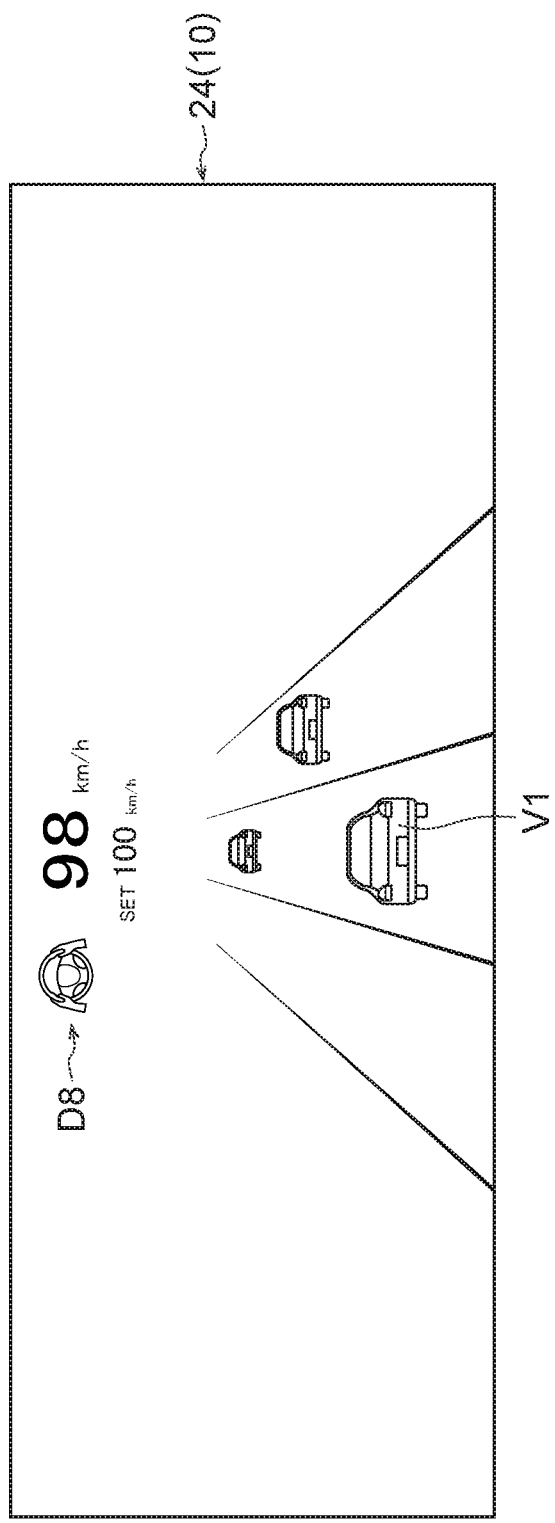
FIG. 11 is a front view showing an example display, on the MET, of an icon D8 requesting that an occupant continue to grip a steering wheel of the vehicle to which the vehicle display control device pertaining to the embodiment of the disclosure has been applied.

Moreover, when the occupant grips the steering wheel 16 (see FIG. 1), as shown in FIG. 10 the display control unit 62 displays an animation in which the icon D5 disappears as it moves (icon D7). Then, when the animation ends, as shown in FIG. 11 the display control unit 62 causes the icon D8 to flash on and off to request that the occupant continue to grip the steering wheel 16.

Action and Effects of Vehicle Display Control Device

Next, the action and effects of the vehicle display control device pertaining to the embodiment will be described.

First, display processes on the MET 24 and the HUD 26 shown in FIG. 2 will be described using the flowcharts shown in FIG. 12 and FIG. 13. The display processes are executed as a result of the CPU 30 shown in FIG. 2 reading the vehicle display control program from the ROM 32 or the storage 36, transferring it to the RAM 34, and executing it.

First, the display process before the vehicle 12 switches from the autonomous driving mode to the manual driving mode will be described.

As shown in FIG. 12, in step S100 the CPU 30 determines whether or not the vehicle 12 (see FIG. 1) is in the autonomous driving mode. The CPU 30 moves to the process of step S102 in a case in which it has determined that the vehicle 12 is in the autonomous driving mode (step S100: Y). Furthermore, the CPU 30 ends the display process in a case in which it has determined that the vehicle 12 is not in the autonomous driving mode (step S100: N). Namely, as shown in FIG. 4A and FIG. 4B, the display during normal driving of the vehicle 12 is maintained.

Next, in step S102 the CPU 30 determines whether or not the vehicle 12 is going to switch to the manual driving mode. The CPU 30 moves to the process of step S104 in a case where it has determined that the vehicle 12 is going to switch to the manual driving mode (step S102: Y). It will be noted that the CPU 30 performs this process in step S102 until it determines that the vehicle 12 is going to switch to the manual driving mode.

In step S104 the CPU 30 determines whether or not the occupant is gripping the steering wheel 16 (see FIG. 1). The CPU 30 moves to the process of step S106 in a case where it has determined that the occupant is gripping the steering wheel 16 (step S104: Y).

Next, in step S106 the CPU 30 causes the MET 24 and the HUD 26 to respectively display the icons D1 and D2 (see FIG. 5A and FIG. 5B). Then, in step S108 the CPU 30 switches the vehicle 12 from the autonomous driving mode to the manual driving mode, and the flow ends.

On the other hand, the CPU 30 moves to the process of step S110 in a case in which it has determined in step S104 that the occupant is not gripping the steering wheel 16 (step S104: N). Then, the CPU 30 causes the MET 24 and the HUD 26 to respectively display the icons D3 and D4 (see FIG. 6A and FIG. 6B).

Next, in step S112 the CPU 30 determines whether or not the occupant is gripping the steering wheel 16. The CPU 30 moves to the process of step S108 in a case in which it has determined that the occupant is gripping the steering wheel 16 (step S112: Y).

On the other hand, the CPU 30 moves to the process of step S114 in a case in which it has determined in step S112 that the occupant is not gripping the steering wheel 16 (step S112: N). Then, the CPU 30 causes the vehicle 12 to stop autonomously, and the flow ends. It will be noted that when causing the vehicle 12 to stop autonomously, the vehicle 12 stops autonomously after the CPU 30 has caused the vehicle 12 to move to a position in which the vehicle 12 will not pose an obstacle to other vehicles, such as the side of the road.

As described above, in this embodiment, the CPU 30 requests that the occupant grip the steering wheel 16 before the vehicle 12 (see FIG. 1) is switched from the autonomous driving mode to the manual driving mode, so the CPU 30 is set to cause the MET 24 and the HUD 26 to respectively display in a graduated manner the icons D1 and D2 shown in FIG. 5A and FIG. 5B and the icons D3 and D4 shown in FIG. 6A and FIG. 6B.

Next, the display process before the occurrence of the vehicle event will be described.

As shown in FIG. 13, in step S200 the CPU 30 determines whether or not the vehicle 12 (see FIG. 1) is in the autonomous driving mode. The CPU 30 moves to the process of step S202 in a case in which it has determined that the vehicle 12 is in the autonomous driving mode (step S200: Y). Furthermore, the CPU 30 ends the display process in a case in which it has determined that the vehicle 12 is not in the autonomous driving mode (step S200: N). Namely, as shown in FIG. 4A and FIG. 4B, the display during normal driving of the vehicle 12 is maintained.

Next, in step S202 the CPU 30 determines whether or not a vehicle event is going to occur. The CPU 30 moves to the process of step S204 in a case in which it has determined that the vehicle event is going to occur (step S202: Y). It will be noted that the CPU 30 performs this process in step S202 until it determines that the vehicle event is going to occur.

In step S204 the CPU 30 determines whether or not the occupant is gripping the steering wheel 16 (see FIG. 1). The CPU 30 moves to the process of step S206 in a case in which it has determined that the occupant is gripping the steering wheel 16 (step S204: Y).

Next, in step S206 the CPU 30 causes the MET 24 and the HUD 26 to display the icon D8 (see FIG. 11). Then, the CPU 30 ends the flow when the vehicle event occurs in step S208.

On the other hand, the CPU 30 moves to the process of step S210 in a case in which it has determined in step S204 that the occupant is not gripping the steering wheel 16 (step S204: N). Then, the CPU 30 causes the MET 24 and the HUD 26 to display the icons D5 and D6 (see FIG. 8 and FIG. 9).

Next, in step S212 the CPU 30 determines whether or not the occupant is gripping the steering wheel 16. The CPU 30 moves to the process of step S214 in a case in which it has determined that the occupant is gripping the steering wheel 16 (step S212: Y).

In step S214 the CPU 30 causes the MET 24 and the HUD 26 to display the icon D7 (see FIG. 10). Then, the CPU 30 moves to the process of step S206. On the other hand, in a case in which the CPU 30 has determined in step S212 that the occupant is not gripping the steering wheel 16 (step S212: N), the CPU 30 performs this process until it determines that the occupant is gripping the steering wheel 16 (see FIG. 8 and FIG. 9).

As described above, in this embodiment, the CPU 30 issues request that the occupant grip the steering wheel 16 before the vehicle event (see FIG. 1) occurs, so the CPU 30 is set to cause the MET 24 and the HUD 26 to display the icons D5 to D7 shown in FIG. 8 to FIG. 10.

In this embodiment, the icons D3 and D4 shown in FIG. 6A and FIG. 6B are displayed more prominently than the icons D1 and D2 shown in FIG. 5A and FIG. 5B. Because of this, the occupant can see that at least one of the distance and the time until the vehicle 12 is switched from the autonomous driving mode to the manual driving mode has become equal to or less than the predetermined value (threshold value) and that there is a great urgency to grip the steering wheel 16. It becomes possible to induce the occupant to immediately grip the steering wheel 16.

In this way, when the at least one of the distance and the time until the vehicle 12 is switched from the autonomous driving mode to the manual driving mode becomes shorter than the predetermined value (threshold value), the need to request that the occupant grip the steering wheel 16 becomes greater than in a case in which the at least one of the distance and the time is longer than the preset threshold value.

In this embodiment, the CPU 30 causes the MET 24 and the HUD 26 to display the icons D3 and D4 (fourth inducement image) in a case in which the at least one of the distance and the time until the vehicle 12 switches from the autonomous driving mode to the manual driving mode has become shorter than the preset threshold value more prominently than the icons D1 and D2 (fifth inducement image) in a case in which the at least one of the distance and the time is longer than the preset threshold value. Namely, in this embodiment, it becomes possible to further attract the occupant's attention by making the icons D3 and D4 more conspicuous than the icons D1 and D2.

It will be noted that although here the relationship between the distance and the time, until the vehicle 12 is switched from the autonomous driving mode to the manual driving mode, and the icons has been described, the relationship between the distance and the time, until the occurrence of the vehicle event, and the icons is also substantially the same.

When the vehicle 12 switches from the autonomous driving mode to the manual driving mode, the vehicle 12 cannot be switched to the manual driving mode unless the occupant grips the steering wheel 16, so in this case the vehicle 12 is forced to come to a stop. On the other hand, in a case of requesting that the occupant continue to grip the steering wheel 16 as the vehicle 12 is continuing to drive autonomously, the vehicle 12 is not forced to come to a stop as a result of the occupant not gripping the steering wheel 16.

Consequently, in this embodiment, the need to request that the occupant grip the steering wheel 16 becomes greater in a case of requesting that the occupant grip the steering wheel 16 before the vehicle 12 switches from the autonomous driving mode to the manual driving mode than in a case of requesting that the occupant continue to grip the steering wheel 16 as the vehicle 12 is continuing to drive autonomously.

In this embodiment, the CPU 30 causes the MET 24 and the HUD 26 to display the icons D1 to D4 (see FIG. 5A, FIG. 5B, FIG. 6A, and FIG. 6B) in a case of requesting that the occupant grip the steering wheel 16 before the vehicle 12 switches from the autonomous driving mode to the manual driving mode more prominently than the icon D8 (see FIG. 11) in a case of requesting that the occupant continue to grip the steering wheel 16 as the vehicle 12 is continuing to drive autonomously.

The icons D1 to D4 can be made more conspicuous than the icon D8. In other words, in this embodiment, the icon D8 is less conspicuous than the icons D1 to D4, so in a case of requesting that the occupant continue to grip the steering wheel 16 as the vehicle 12 is continuing to drive autonomously, the annoyance that the occupant may feel is mitigated.

Moreover, in this embodiment, the need to request that the occupant grip the steering wheel 16 becomes greater in a case of requesting that the occupant grip the steering wheel 16 before the occurrence of the vehicle event as the vehicle 12 is continuing to drive autonomously than in a case of requesting that the occupant continue to grip the steering wheel 16 as the vehicle 12 is continuing to drive autonomously.

In this embodiment, the CPU 30 causes the MET 24 and the HUD 26 to display the icons D5 and D6 (see FIG. 8) and the icon D7 (see FIG. 10) more prominently in a case of requesting that the occupant grip the steering wheel 6 before the occurrence of the vehicle event as the vehicle 12 is continuing to drive autonomously, than the icon D8 (see FIG. 11) in a case of requesting that the occupant continue to grip the steering wheel 16 as the vehicle 12 is continuing to drive autonomously.

That is, in this embodiment, the icons D5 to D7 are made more conspicuous than the icon D8. In other words, in this embodiment, the icon D8 is less conspicuous than the icons D5 to D7, so in a case of requesting that the occupant continue to grip the steering wheel 16 as the vehicle 12 is continuing to drive autonomously, the annoyance that the occupant may feel is mitigated.

In this connection, as described above, when the vehicle 12 switches from the autonomous driving mode to the manual driving mode, the vehicle 12 cannot be switched to the manual driving mode unless the occupant grips the steering wheel 16, so in this case the vehicle 12 is forced to come to a stop. On the other hand, the CPU 30 requests that the occupant grip the steering wheel 16 before the occurrence of an event as the vehicle 12 is continuing to drive autonomously, but in this case the potential for the vehicle 12 to be forced to come to a stop as a result of the occupant not gripping the steering wheel 16 is low.

Namely, the need to request that the occupant grip the steering wheel 16 is greater in a case of requesting that the occupant grip the steering wheel 16 before the vehicle 12 switches from the autonomous driving mode to the manual driving mode than in a case of requesting that the occupant grip the steering wheel 16 before the occurrence of the vehicle event as the vehicle 12 is continuing to drive autonomously.

In this embodiment, the CPU 30 causes the MET 24 and the HUD 26 to display the icons D1 to D4 more prominently than the icons D5 to D7. That is, in this embodiment, the icons D1 to D4 are made more conspicuous than the icons D5 to D7.

Namely, by changing the icons in accordance with the degree of the need for the occupant to grip the steering wheel 16, a balance is achieved between making the icons conspicuous in situations where the need to request that the occupant grip the steering wheel 16 is great and mitigating the annoyance of the icons in situations where the need to request that the occupant grip the steering wheel 16 is small.

The vehicle display control device pertaining to the embodiment has been described above, but the vehicle display control device can be implemented in various ways in a range that does not depart from the scope of the invention. For example, in the embodiment, the MET 24 is provided on the vehicle front side of the driver's seat in the instrument panel 14, and the HUD 26 is configured as a plane of projection projected by the head-up display device 44, but they are not limited to this. That is, the display unit may also be a center display provided in the vehicle width direction center portion of the instrument panel 14.

Furthermore, in the above embodiment, various types of processors other than the CPU 30 may also execute the display processes that the CPU 30 executed by reading software (a program). Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the display processes may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Moreover, in the above embodiment, various types of data are stored in the storage 36, but the vehicle display control device is not limited to this. For example, recording media such as a compact disc (CD), a digital versatile disc (DVD), and a universal serial bus (USB) memory may also serve as a storage unit. In this case, the vehicle display control program and the data become stored in these recording media.

What is claimed is:

1. A vehicle display control device, comprising:
   a memory; and
   a processor coupled to the memory, the processor being configured to:
   cause a display unit provided in a vehicle cabin to display one of a first inducement image, a second inducement image and a third inducement image requesting that an occupant grip a steering wheel,
   cause the display unit to display the first inducement image or the second inducement image based on at least one of a distance or a time until the vehicle switches from an autonomous driving mode to a manual driving mode, in a case of requesting that the occupant grip the steering wheel before the vehicle switches from the autonomous driving mode to the manual driving mode,
   cause the display unit to display the third inducement image for requesting that the occupant continues to grip the steering wheel as the vehicle is continuing to drive autonomously, and
   cause the display unit to display a fourth inducement image in a case of requesting that the occupant grip the steering wheel before an occurrence of a vehicle event which comprises vehicle merging, vehicle changing lanes, and vehicle approaching an intersection, as the vehicle is continuing to drive autonomously, wherein:
   the fourth inducement image is displayed in one of the following manners as compared to the third inducement image:
      having an increased density, having an increased brightness, having an increased size, having a differently oriented position, or having an increase in flashing on and off, and
   the first inducement image or the second inducement image is displayed in one of the following manners as compared to the fourth inducement image:
      having an increased density, having an increased brightness, having an increased size, having a differently oriented position, or having an increase in flashing on and off.

2. The vehicle display control device of claim 1, wherein the processor is configured to:
   cause the display unit to display the first inducement image in a case in which the at least one of the distance or the time is longer than a preset threshold value, and
   cause the display unit to display the second inducement image in a case in which the at least one of the distance or the time has become shorter than the preset threshold value.

3. The vehicle display control device of claim 1,
   wherein the processor causes the display unit to display an animation in which the fourth inducement image disappears as it moves when the occupant grips the steering wheel.

4. The vehicle display control device of claim 3 wherein the processor is configured to cause the display unit to display the third inducement image after the animation is ended.

5. A vehicle display system, comprising:
the vehicle display control device of claim 3; and
the display unit that is provided in the vehicle cabin and displays the one of the first inducement image, second inducement image, third inducement image and fourth inducement image requesting that the occupant grip the steering wheel.

6. A vehicle display system, comprising:
the vehicle display control device of claim 1; and
the display unit that is provided in the vehicle cabin and displays the one of the first inducement image, second inducement image, third inducement image, and fourth inducement image requesting that the occupant grip the steering wheel.

7. A vehicle display control method, comprising executing processing by a computer, the processing including:
selecting between displaying a plurality of inducement images including a first inducement image, a second inducement image, a third inducement image, and a fourth inducement image requesting that an occupant grip a steering wheel;
displaying the first inducement image or the second inducement image based on at least one of a distance or a time until the vehicle switches from an autonomous driving mode to a manual driving mode, in a case of requesting that the occupant grip the steering wheel before the vehicle switches from an autonomous driving mode to a manual driving mode;
displaying the third inducement image in a case of requesting that the occupant continues to grip the steering wheel as the vehicle is continuing to drive autonomously; and
displaying the fourth inducement image in a case of requesting that the occupant grip the steering wheel before an occurrence of a vehicle event which comprises vehicle merging, vehicle changing lanes, and vehicle approaching an intersection, as the vehicle is continuing to drive autonomously,
wherein:
the fourth inducement image is displayed in one of the following manners as compared to the third inducement image: having an increased density, having an increased brightness, having an increased size, having a differently oriented position, or having an increase flashing on and off, and
the first inducement image or the second inducement image is displayed in one of the following manners as compared to the fourth inducement image: having an increased density, having an increased brightness, having an increased size, having a differently oriented position, or having an increase in flashing on and off.

8. The vehicle display control method of claim 7, the processing including:
displaying an animation in which the fourth inducement image disappears as it moves when the occupant grips the steering wheel.

9. A non-transitory storage medium storing a vehicle display control program executable by a computer to perform processing, the processing including:
selecting between displaying a plurality of inducement images including a first inducement image, a second inducement image, a third inducement image, and a fourth inducement image requesting that an occupant grip a steering wheel;
displaying the first inducement image or the second inducement image based on at least one of a distance or a time until the vehicle switches from an autonomous driving mode to a manual driving mode, in a case of requesting that the occupant grip the steering wheel before the vehicle switches from an autonomous driving mode to a manual driving mode;
displaying the third inducement image for requesting that the occupant continues to grip the steering wheel as the vehicle is continuing to drive autonomously; and
displaying the fourth inducement image in a case of requesting that the occupant grip the steering wheel before an occurrence of a vehicle event which comprises vehicle merging, vehicle changing lanes, and vehicle approaching an intersection, as the vehicle is continuing to drive autonomously,
wherein:
the fourth inducement image is displayed in one of the following manners as compared to the third inducement image: having an increased density, having an increased brightness, having an increased size, having a differently oriented position, or having an increase in flashing on and off, and
the first inducement image or the second inducement image is displayed in one of the following manners as compared to the fourth inducement image: having an increased density, having an increased brightness, having an increased size, having a differently oriented position, or having an increase flashing on and off.

10. The non-transitory storage medium of claim 9, the processing including:
displaying an animation in which the fourth inducement image disappears as it moves when the occupant grips the steering wheel.

* * * * *